Nov. 19, 1957     H. D. H. MacDONALD     2,813,958
WEIGHING CELLS
Filed July 20, 1955     4 Sheets-Sheet 1
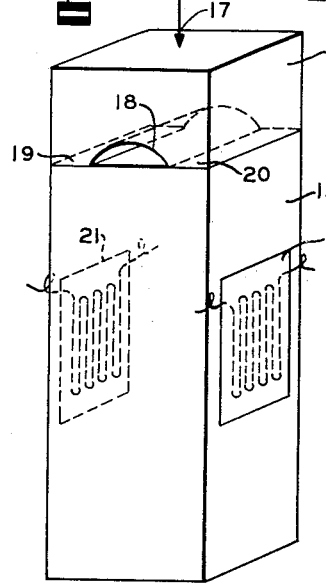
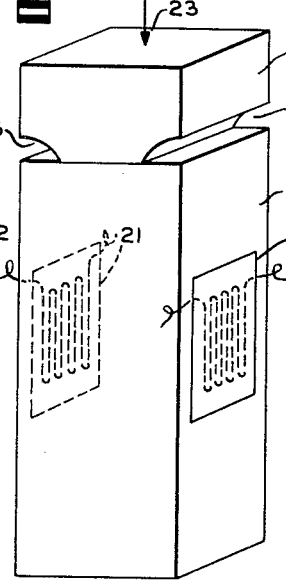
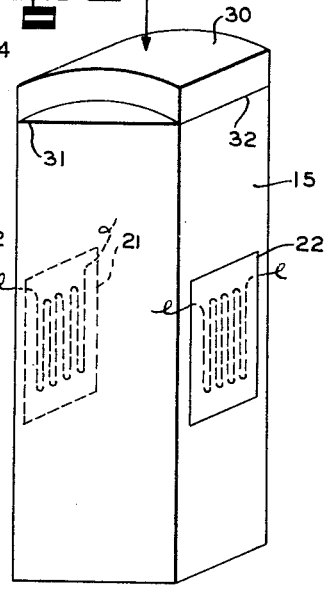
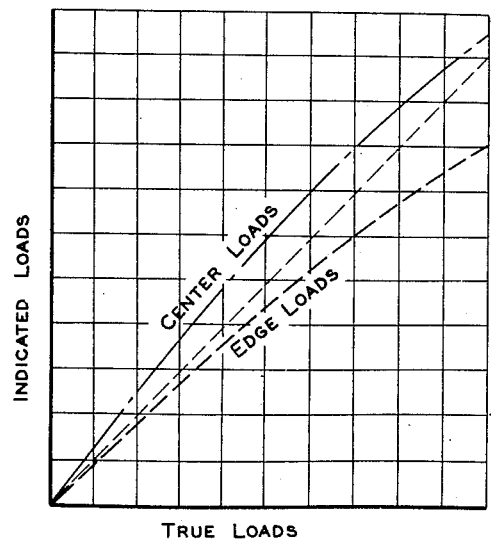
INVENTOR.
HUGH D. H. MACDONALD
BY
Ward, Neal, Haselton, Orme & McElhannon
ATTORNEYS Nov. 19, 1957 — H. D. H. MacDONALD — 2,813,958
WEIGHING CELLS
Filed July 20, 1955 — 4 Sheets-Sheet 2
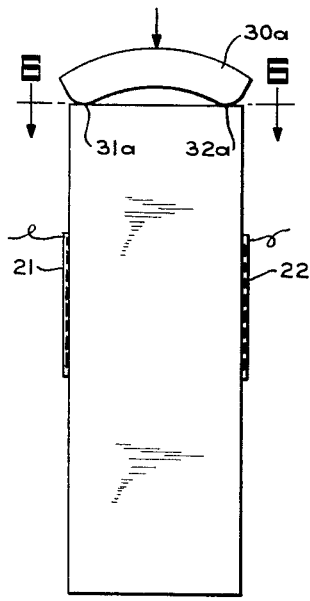
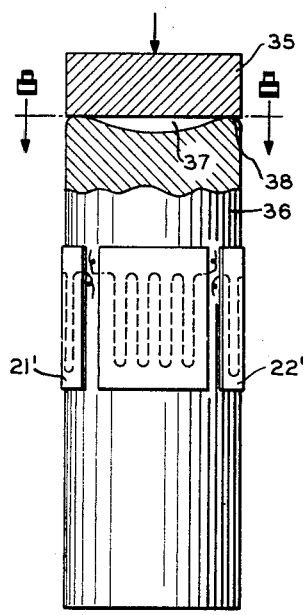
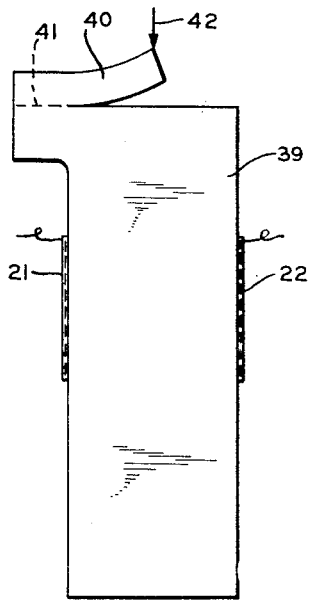
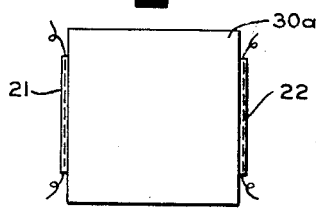
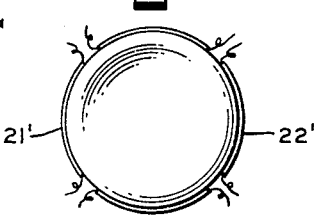
INVENTOR.
HUGH D. H. MAC DONALD
BY
Ward, Neal, Haselton, Orme & McElhannon
ATTORNEYS INVENTOR.
HUGH D. H. MAC DONALD
BY
Ward, Neal, Haselton, Orme & Mc Elhannon
ATTORNEYS

United States Patent Office 2,813,958
Patented Nov. 19, 1957

2,813,958

WEIGHING CELLS

Hugh D. H. MacDonald, East Haven, Conn., assignor to Revere Corporation of America, Wallingford, Conn., a corporation of New Jersey Application July 20, 1955, Serial No. 523,210

8 Claims. (Cl. 201—63)

This invention relates to load measuring cells or assemblies and more particularly to apparatus of that class embodying strain gauges preferably, although not necessarily, of the form wherein filaments, or the like, of electrical resistance material are bonded to columns or the like, which are subjected to the loads to be measured.

Load measuring cells of this general class and in a form which has heretofore been widely used, are disclosed in Figures 1 to 4, inclusive, of the U. S. patent to Thurston, No. 2,488,349, granted on November 15, 1949. When cells of that form are used, they are subjected to compression by the load to be measured and whereby the columns in the cell, to which the strain gauges are bonded, will be subjected to a strain, and according to Hooke's law the strain which is measured by the gauges will be directly proportional to the stress to which the columns are subjected. However, as the columns are compressed and thereby shortened by small increments under increased loads, the cross-sectional dimensionals of the columns, if not restrained, will increase according to Poisson's rule. Similarly, if the columns should be subjected to lengthwise tension, the cross-sectional dimensionals would shrink. If such cross-sectional dimensions did not change, then the fibre stress in the columns would be proportional to the total load and then a curve representing the relationship between true loads and the loads indicated by the cell would be a straight line. But because of the slight changes in the cross-sectional dimensions, the rate of increase of the fibre stress and of the consequent strain, decreases by small increments with increments of increased compressive loads, and the opposite effect occurs with increasing tension loads. Hence, with such cells of the type heretofore generally used, wherein the columns bearing the gauges are subjected to compression, the curve representing the relationship of true loads to the loads indicated by the cell, will have a gradual sagging curvature with heavier loads. Heretofore to compensate for such deviation from a straight line relationship, it has been the practice manually to make certain balancing adjustments in the instrumentation used to measure the output from the gauges. But this procedure, in addition to involving an inconvenience, prevents ready interchangeability of the cells in use, and also where a plurality of the cells are used collectively, as for weighing a platform for example, the total output from the group of cells will generally involve at least some slight deviation from what it should be to represent the true load, because the compensations necessary for the different cells will differ slightly and thus cannot readily be made for the group as a whole. For example, if a weighing platform is supported by four identical cells but which give slightly non-linear responses and all cells are loaded to one-half full load by a weight placed in the center of the platform, then the total output from all four cells will involve a certain deviation. Now if the load on the platform is moved to another point where it is completely supported by only two of the four cells, the idle cells will have zero output and the two fully loaded cells will have full output but with a percentage deviation different from the deviation in the total output when all four cells were under one-half of their full load. Hence merely by moving a load about on the platform the total output from identical but non-linear cells will change and this change cannot be compensated for without correcting each cell output individually or by eliminating the non-linearity.

But by the use of the present invention, it has been found that a cell of this class may be so made as to provide a substantially straight line relationship between the true loads and the indicated loads substantially throughout the effective range of response of the cell, thereby avoiding the compensations necessary to correct deviations at different loads in different cells, and permitting the use of standardized cells interchangeably and in groups giving highly accurate responses.

Proposals were made in the above-mentioned patent for achieving this result, as with a column such as of Figure 15 of said patent having a gauge of a special form which encircles a specially shaped column and so that the gauge filament is tensioned when the column is under compression, the column being intended to have a shape such that the gauge would give a straight line response. However, the forming of such specially shaped columns and the applying thereto of such special encircling type gauges, involves considerable difficulties and possible resulting inaccuracies which are avoided by the present invention.

The present invention is based on the fact that when a column bearing bonded gauges at each side thereof is subjected to a load applied, for example, at or near the middle of the top of the column, then the output or response of the gauges will be greater than when the same load is applied to points directly above the gauges. That is, while it normally would be expected that the gauges would be affected more by the load when applied directly above same, yet quite unexpectedly it has been found experimentally that the opposite is the case in practice, that is, the output of the gauges increases as the applied load is moved toward the middle of the top of the column and away from points directly above the gauges. According to the present invention, advantage is taken of this fact to compensate for the above-described deviations, and this is accomplished by providing means such as an arch-like yieldable member or an equivalent arrangement at the end of the column and so that as increasing loads are applied to such member, its inner under portions will yield and apply slightly higher proportions of the load at points nearer the middle of the top of the column. Thus, in the case of a column under compression for example, the deviations in the outputs of the strain gauges thereon are such that the responses may be represented by a curve which, with greater loads, sags below a straight line, and it is possible to compensate for such output deviations by gradually increasing the gauge outputs through the shifting of portions of the loads toward the middle at the top of the column as the load increases. Similarly if the column is one which is to be subjected to tension rather than compression loads, the yieldable member may be designed to shift portions of the load gradually toward points directly above the gauges as the load increases, thus bringing the output response curve down to approximately a straight line instead of its having a slightly more and more upward curvature, as it would normally have due to deviations in the responses of gauges on a tensioned column.

Various further and more specific objects, features and advantages of the invention will appear from the description given below taken in connection with the accompanying drawings illustrating by way of example certain preferred forms of the invention.

In the drawings:

Figures 1 and 2 are perspective views of a column with bonded strain gauges at opposite surfaces thereof, the column of Fig. 1 being accompanied by a load-applying member which applies the load at regions directly above the gauges, whereas in Fig. 2 the load-applying member is shaped and positioned to apply the load at the region of the middle of the top of the column;

Figure 3 is a similar view but with a load-applying member in the form of a stiff arched leaf spring member;

Figure 10:
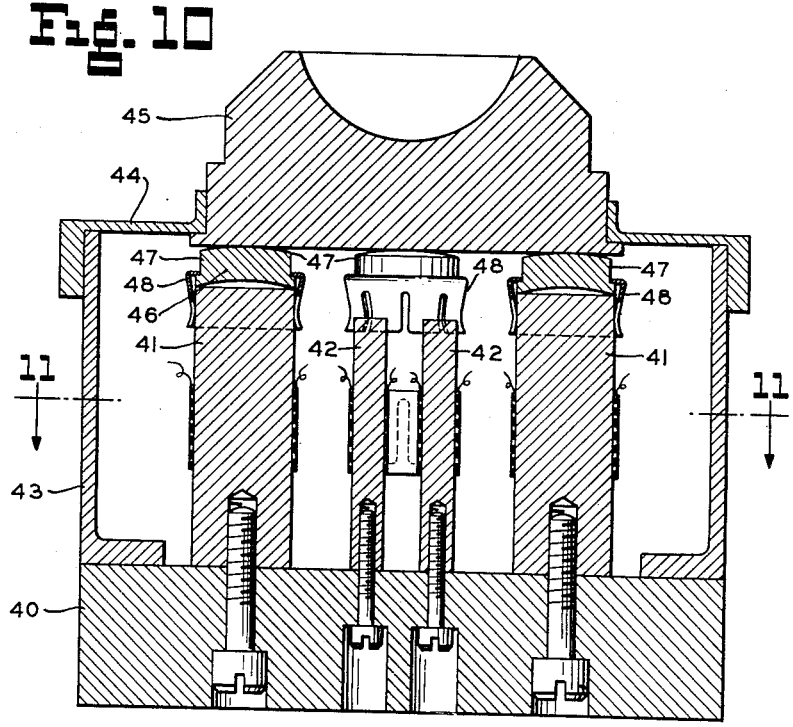
Figure 11:
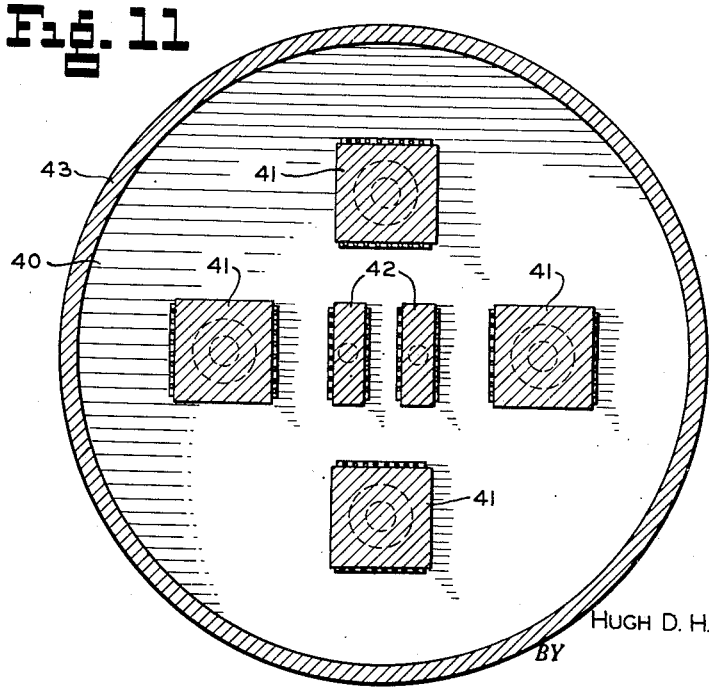
Figure 12:
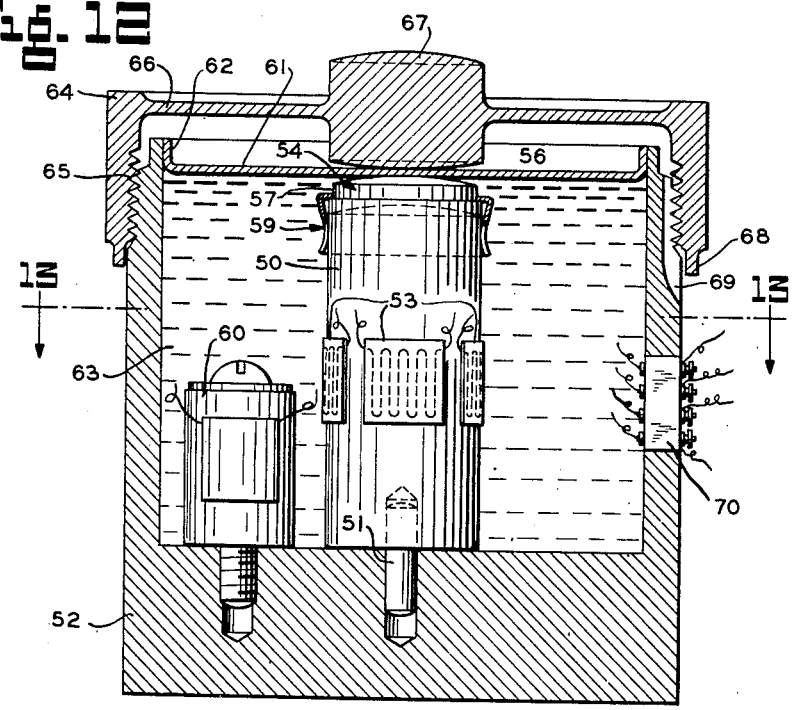
Figure 13:
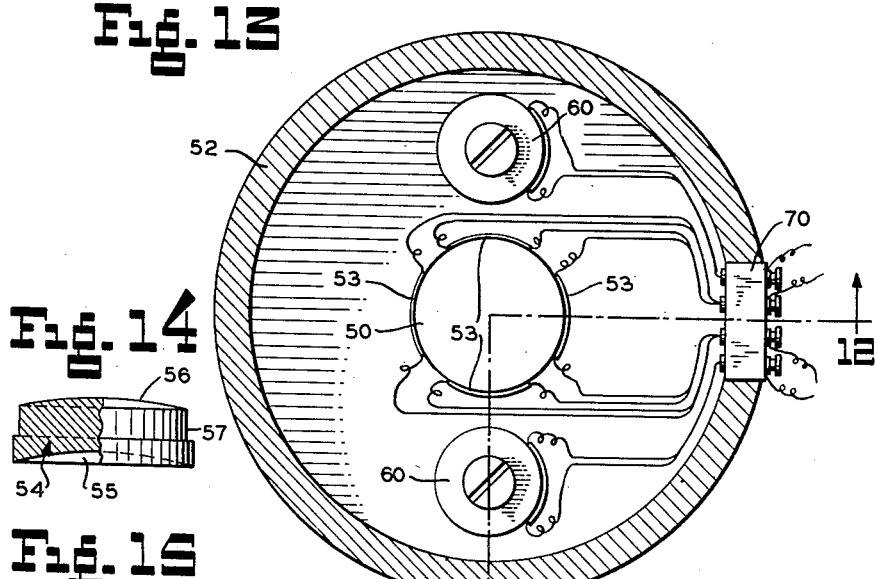

Figure 4 comprises curves showing the relationship between indicated loads and true loads, as will be hereinafter explained;

Figures 5 to 9, inclusive, are views showing modifications of the assembly of Fig. 3, Figs. 5, 7 and 9 being side elevational views, Fig. 7 showing the parts partially in vertical section, and Figs. 6 and 8 being horizontal sectional views taken along lines 6—6 and 8—8, respectively of Figs. 5 and 7;

Figure 10 is a vertical sectional view of a weighing cell assembly embodying the invention;

Figure 11 is a sectional view taken substantially along the line 11—11 of Fig. 10;

Figure 12 is a vertical sectional view of another cell assembly embodying the invention;

Figure 13 is a view taken substantially along line 13—13 of Figure 12; and

Figure 14:
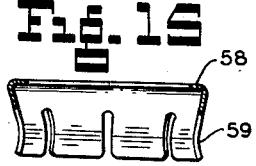
Figure 15:
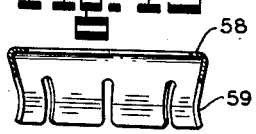

Figures 14 and 15 are views partly in section of certain of the parts of Figure 12.

Referring now to Fig. 1, a column member is indicated at 15 surmounted by a member 16 adapted to transmit, for example, a compression load as indicated by the arrow 17 to the column. It will be noted that the underside of the member 16 has cut therefrom an arch-shaped cavity 18, so that the load will be transmitted by portions 19 and 20 to areas at the top of the column at or close to the vertical planes which pass through bonded strain gauges, as at 21, 22, applied to the side surfaces of the column. The output of the strain gauges, that is, the loads indicated thereby in relation to the true loads, will vary according to the curve marked "edge loads" in Fig. 4. That is, with greater loads, because of the above-described deviations, the curve will sag below the desired straight line.

If, however, a load as indicated by the arrow 23 of Fig. 2 is applied to the column 15 through a cap member as at 24, then a considerable portion of the load, as will be apparent, is applied at or adjacent the center of the top of the column by reason of the fact that the edges of the cap member are cut away, as at 25, 26. In this case, the relationship between indicated loads and true loads will be such as shown by the curve in Fig. 4, marked "center loads." That is, this curve, as in the case of the "edge loads" curve, will have the normal deviation or sagging but the "center loads" curve will follow a line further and further above the "edge loads" curve. It will be understood that the actual difference between these two curves is substantially exaggerated for clearness in Fig. 4, since, for example, with a maximum load of 50,000 lbs., the maximum deviations may be only 50 to 60 lbs., and the actual maximum difference between the curves may be in the neighborhood of 400 lbs. But both curves will have substantially the same percentage of deviation.

Referring now to Fig. 3, the column means is here shown with a load-applying member surmounting same, in the form of a relatively stiff arched leaf spring-like member which initially applies the load at its end edges 31, 32 along lines respectively, which are in the same vertical planes as the gauges 21 and 22. Thus with this assembly starting at just above zero load, the output of the gauges will vary according to the lower portions to "edge loads" curve of Fig. 4. Then, if the member 30 is sufficiently resilient as the load increases, wider and wider portions of the end edges at 31, 32 will come into contact with the top of the column, that is to say, at regions somewhat closer to the center of the column, with the result that the load response curve instead of sagging at its upper portions, will tend to more nearly approximate a straight line.

In order to accomplish the desired result more effectively, the lower end edges of the load-transmitting member may be curved as indicated at 31a and 32a on the member 30a of Fig. 5. And by trial with various such curvatures, the load response curve may be brought to a straight line with a sufficient degree of accuracy to compensate for the deviations.

It will be understood that instead of using an arch-shaped load-applying member, as an equivalent, one might use a member such as indicated at 35 in Fig. 7, having a flat under-surface adapted to engage a column as at 36, having a concave upper surface as indicated at 37, preferably with rounded peripheral edge portions as at 38. It will be noted that the column 36 in Fig. 7 is shown of cylindrical form, having gauges of arcuate cross-section as at 21' and 22' bonded thereto on all sides.

Another possible variation is shown in Fig. 9, wherein column 39 has secured to the top portion thereof, a leaf spring-like member 40 welded or otherwise attached as at 41 and bowing upwardly to receive a load indicated by the arrow 42. In this case, it will be apparent also that when the load is increased, the areas of application of load to the column will be gradually extended toward the center of the column and to points spaced from the vertical plane of the gauge 21.

Referring now to Fig. 10, there is here shown a weighing cell similar to the one above referred to in the above-mentioned Thurston patent, but modified to embody the present invention. The cell as here shown comprises a base 40 to which four columns, as at 41, are screwed. These columns bear the strain gauges and surround, for example, two dummy columns as at 42, for bearing temperature compensation gauges. The cell may include a casing 43 with a flexible cover 44 similar to those disclosed in the above-mentioned patent and surrounding a load-receiving member 45.

Each of the columns is surmounted by an arch-shaped member 46 comparable to the member 30a, shown in Fig. 5 for example, except that the upper end edge portions thereof are formed with grooves 47 adapted to be engaged by spring-clip means, as at 48, to hold the member 46 against displacement by shocks and during assembly. It will be understood that the lower surface of the member 45 rests upon the upper surface of the member 46 and with some pressure, if desired, applied by the flexible cover member 44, so that the cell will in effect be slightly preloaded.

In Fig. 12 an hermetically sealed form of cell embodying the invention is shown, having a cylindrical column 50 secured at its lower end, as by a pin 51, to the base of a shell 52. Strain gauges as at 53 are bonded at symmetrically spaced locations all around the mid-portions of the column 50. The column 50 is surmounted by a load-transmitting member 54 of disc-like form, the under-surface 55 being concave, the upper surface 56 being convex. The upper peripheral edge is formed by an annular cut-away portion 57 adapted to receive an in-turned flange, as at 58, of a spring-clip member 59. The lower portions of such spring-clip member frictionally grip the upper end of the column 50, whereby the member 54 will be retained in place against dislodgment.

It will be understood that the member 54 acts in a manner generally comparable to the member 30a of Fig. 5, although the member 54 has a circular outline as per the member 35 of Fig. 7. The lower peripheral edge of the member 54 initially applies the load along the upper peripheral edge of the column 50, so that at the start the gauges will have minimum sensitivity. Then, as the load increases, the effective circle of application of the load is reduced in diameter since the member 54 acts in effect as a cap-shaped spring. For clearness, the concavity 55 as well as the convexity of the upper surface 56 of this member are shown considerably exaggerated in Fig. 14. The preferred degrees of curvature of these surfaces may be determined by trial and so as to secure the desired substantially straight line response from the cell. It will be understood that the cavity between the member 54 and column might, if desired, be formed in the top of the column as in Fig. 7 instead of in the member 54.

Posts or dummy columns as at 60 may be provided for carrying temperature compensating resistances or other purposes. The upper portion of the casing 52 may be provided with a closure diaphragm 61 welded or otherwise securely affixed around its periphery at 62 within the upper end of the casing so as to form an hermetical seal. The interior of this seal may be filled with a suitable liquid as indicated at 63, such as oil, to reduce temperature gradients and the climatic effects of varying barometric pressures, particularly on the "no load" output of the seal. Alternatively, if desired, the cell may be filled by pouring in a suitable material such as a wax or of a waxy nature or other material, which will solidify and thereby reduce the effect of vibrations on the cell and possibly render it unnecessary to provide an hermetic seal.

Preferably this cell is formed with an additional top cover 64 threaded in place as indicated at 65 and having a rigid rim made integral with the diaphragm portion 66 which in turn may be made integral with a load-transmitting rigid portion 67, which bears against the diaphragm 61 to thereby impart the loads in turn to the member 54. The load-transmitting portion 67 serves to assure uniform compression loading on the center of the diaphragm 61 and thence on the upper rounded end 56 of the member 54. This outer cover portion helps to protect the hermetic seal portion of the diaphragm 61 and at the same time provides means for applying a definite "preload" to the center column thereby eliminating so-called "no load" signals and consequent possible inaccuracies, that is, the top cap may be screwed down or adjusted in position until the desired "preload" is established on the column means of the cell, then it may be locked in place as by having a depending portion 68 which may be bent into a milled slot or the like 69, formed on the casing.

Hermetically sealed outlet terminal means for the connections to the strain gauges may be provided as indicated at 70.

Although certain particular embodiments of the invention are herein disclosed for purposes of explanation, various further modifications thereof, after study of this specification, will be apparent to those skilled in the art to which the invention pertains, reference should accordingly be had to the appended claims in determining the scope of the invention.

For example, while the somewhat flexible load-transmitting members are herein shown and referred to as being applied to the tops of the columns, it will be obvious that equivalent constructions may be provided with such members at the bottom ends of the columns. It will also be understood that a variety of different patterns and degrees of sensitivity as to the responses of the gauges, when the areas of application of the loads are shifted, may be obtained with columns of various different dimensions and cross-sectional shapes and depending on the locations where the gauges are applied thereto.

What is claimed and desired to be secured by Letters Patent is:

1. A load measuring device comprising: a column-like member with electrical strain gauge means bonded to its side surface; a member for applying loads to an end of said column member, one of said members at low loads engaging the other of said members adjacent the peripheral edge of said end, and one of said members being yieldable under increasing loads so that as the load is increased the areas over which the load is applied on the column will be varied, thereby altering the relationship between true loads and loads indicated by the gauge means.

2. In a load measuring device, the combination comprising: a column-like member having electrical strain gauge means mounted on its side surface, and a member for applying loads to at least one end of said column-like member, one of said members being yieldable under increasing loads and at low loads engaging the other of said members adjacent a plane passing through the gauge means and extending longitudinally of the column whereby, as the load is increased, the areas over which the load is applied to the column will be increased thereby altering the relationship between true loads and loads indicated by the gauge means.

3. In a load measuring device, the combination comprising: a column member subject to the Poisson effect, said column member having electrical strain gauge means mounted to its side surface, said gauge means being more sensitive to loads applied to certain areas than when the same loads are applied to other areas on an end of the column, a load-applying member at low loads contacting an end of the column at predetermined areas adjacent at least one side edge of said end, said load-applying member being yieldable to increase the areas of application under increasing loads whereby the responses of the gauge means will be modified to compensate for deviations between true loads and loads indicated by said gauge means.

4. The combination in accordance with claim 3 and in which the load applying member is somewhat arch-shaped with its end portions engaging the end of the column means at or adjacent the end of the side surface portion or portions thereof which bear the gauge means.

5. The combination in accordance with claim 3 and in which the load applying member is somewhat arch-shaped and with its lower end edges of rounded formation in engagement with areas on the column means adjacent the end of the side surfaces thereof which bear the gauge means.

6. The combination in accordance with claim 3 and in which an end of the column member is formed with a central depression and with somewhat rounded relatively elevated portions adjacent the end of the side surface portion of the column which bear the gauge means, the load applying member engaging said rounded elevations.

7. The combination in accordance with claim 3 and in which spring clip means are provided for removably retaining the load applying member in engagement with the end of the column.

8. The combination in accordance with claim 3 and in which the load applying member and the column means are of circular cross-section and the load applying member is of somewhat dished shape, whereby its peripheral portions engage the column.

References Cited in the file of this patent

UNITED STATES PATENTS

| | | |
|---|---|---|
| 2,472,045 | Gibbons | May 31, 1949 |
| 2,487,595 | Ruge | Nov. 8, 1949 |
| 2,488,347 | Thurston | Nov. 15, 1949 |
| 2,488,348 | Ruge | Nov. 15, 1949 |
| 2,561,318 | Ruge | July 17, 1951 |
| 2,576,417 | Ruge | Nov. 27, 1951 |